United States Patent
Bryant, III et al.

(10) Patent No.: US 10,706,271 B2
(45) Date of Patent: Jul. 7, 2020

(54) PHOTOGRAPHIC EMOJI COMMUNICATIONS SYSTEMS AND METHODS OF USE

(71) Applicants: Thomas Floyd Bryant, III, Round Rock, TX (US); Henry Michael Pena, Round Rack, TX (US)

(72) Inventors: Thomas Floyd Bryant, III, Round Rock, TX (US); Henry Michael Pena, Round Rack, TX (US)

(*) Notice: Subject to any disclaimer, the term of this patent is extended or adjusted under 35 U.S.C. 154(b) by 0 days.

(21) Appl. No.: 15/945,240

(22) Filed: Apr. 4, 2018

(65) Prior Publication Data

US 2019/0311189 A1 Oct. 10, 2019

(51) Int. Cl.
| G06K 9/00 | (2006.01) |
| H04L 12/58 | (2006.01) |
| G06F 3/0481 | (2013.01) |
| G06F 3/0484 | (2013.01) |
| G06Q 50/00 | (2012.01) |

(52) U.S. Cl.
CPC ..... G06K 9/00308 (2013.01); G06F 3/04817 (2013.01); G06F 3/04845 (2013.01); H04L 51/04 (2013.01); G06Q 50/01 (2013.01)

(58) Field of Classification Search
None
See application file for complete search history.

(56) References Cited

U.S. PATENT DOCUMENTS

| 8,885,066 B2 | 11/2014 | Rindfuss et al. |
| 9,331,970 B2 | 5/2016 | Yuen et al. |
| 9,684,430 B1* | 6/2017 | Perigault ............. G06F 3/04817 |
| 2014/0279418 A1* | 9/2014 | Rubinstein ............. G06Q 40/00 705/39 |
| 2015/0332088 A1* | 11/2015 | Chembula ................ G06K 9/00 382/203 |
| 2015/0381534 A1* | 12/2015 | Morris .................. H04L 51/046 715/752 |

(Continued)

FOREIGN PATENT DOCUMENTS

| CN | 103886632 | 6/2014 |
| WO | 2019195524 A1 | 10/2019 |

OTHER PUBLICATIONS

International Search Report dated Jul. 4, 2019 issued by ISA/ RU on International Application No. PCT/US2019/025742, filed Apr. 4, 2019 to Bryant III, Thomas et al and entitled "Photographic Emoji Communications Systems and Methods of Use".

(Continued)

*Primary Examiner* — Vu Le
*Assistant Examiner* — Tracy Mangialaschi
(74) *Attorney, Agent, or Firm* — Franklin & Associates International Inc; Matthew Lambrinos

(57) ABSTRACT

Photographic emoji communications systems and methods of use are provided herein. An example method receiving a plurality of image files from a user device, each of the image files including a selfie of the user; for each of the plurality of image files, determining a reaction emotion of an associated selfie based on facial attributes of the user; storing the plurality of image files in a repository, each of the plurality of image files being labeled with a respective reaction emotion as a selfiemoji; receiving a request to include one of the selfiemojis in a message; and inserting one of the selfiemojis into the message.

18 Claims, 9 Drawing Sheets

(56) References Cited

U.S. PATENT DOCUMENTS

| | | | |
|---|---|---|---|
| 2016/0050169 A1 | 2/2016 | Ben Atar | |
| 2016/0055370 A1* | 2/2016 | Garcia | G06K 9/00288 |
| | | | 382/118 |
| 2016/0088144 A1* | 3/2016 | Logan | H04M 1/72552 |
| | | | 455/412.1 |
| 2017/0140214 A1* | 5/2017 | Matas | G06K 9/00315 |
| 2018/0024726 A1* | 1/2018 | Hviding | G06F 3/04845 |
| | | | 715/204 |

OTHER PUBLICATIONS

International Written Opinion dated Jul. 4, 2019 issued by ISA/ RU on International Application No. PCT/US2019/025742, filed Apr. 4, 2019 to Bryant III, Thomas et al and entitled "Photographic Emoji Communications Systems and Methods of Use".

* cited by examiner

PHOTOGRAPHIC EMOJI COMMUNICATIONS SYSTEMS AND METHODS OF USE

FIELD OF THE PRESENT DISCLOSURE

Embodiments of the present disclosure are directed to emoji systems and methods, and more specifically, but not by limitation to systems and methods that allow for the creation and use of photographic emoji communications. Users can create libraries of photographs, videos, animated gifs and so forth that are associated with a unique emotion. The users can use these selfiemojis in place of caricature or animated emojis, allowing for personalization and wider range of captured emotion.

SUMMARY

According to some embodiments, the present disclosure is directed to a method comprising receiving a plurality of image files from a user device, each of the image files comprising a selfie of the user; for each of the plurality of image files, determining a reaction emotion of an associated selfie based on facial attributes of the user; storing the plurality of image files in a repository, each of the plurality of image files being labeled with a respective reaction emotion as a selfiemoji; receiving a request to include one of the selfiemojis in a message; and inserting one of the selfiemojis into the message.

According to some embodiments, the present disclosure is directed to a system comprising processor; and a memory for storing executable instructions, the processor executing the instructions to: receive a plurality of image files from a user device, each of the image files comprising a selfie of the user; for each of the plurality of image files, determine a reaction emotion of an associated selfie based on facial attributes of the user; store the plurality of image files in a repository, each of the plurality of image files being labeled with a respective reaction emotion as a selfiemoji; receive a request to include one of the selfiemojis in a message; and insert one of the selfiemojis into the message.

According to some embodiments, the present disclosure is directed to a non-transitory computer readable medium having recorded thereon a program, the program when executed causing a computer to performs a method comprising: receiving a plurality of image files from a user device, each of the image files comprising a selfie of the user; for each of the plurality of image files, determining a reaction emotion of an associated selfie based on facial attributes of the user; storing the plurality of image files in a repository, each of the plurality of image files being labeled with a respective reaction emotion as a selfiemoji; receiving a request to include one of the selfiemojis in a message; and inserting one of the selfiemojis into the message.

Some embodiments also comprise providing the selfiemojis of other users to the user based on a subscription plan.

One or more embodiments comprise tracking metrics of selfiemojis used by the third party application; and receiving compensation from the third party application based on the tracking metrics.

Various embodiments also comprise providing the user with access to the selfiemojis of the user based on a subscription plan, and providing access to premium photo filters and premium themes to the user for a cost. Some embodiments comprise limiting a number of the selfiemojis that can be utilized by the user in a given period of time.

According to some embodiments, the present disclosure is directed to a method, comprising: presenting, through a graphical user interface on a computing device, a user with a reaction emotion category provided through a prompt; activating a camera of the computing device; obtaining an image file from the user using the camera, the image file comprising a selfie of the user; and storing image file in a repository, the image file being tagged with the reaction emotion as a selfiemoji.

One or more embodiments comprise receiving a request to include the selfiemoji in a message; and inserting the selfiemoji into the message.

In one or more embodiments, the user device automatically captures images (e.g., photograph or video) of the user while the user is viewing or otherwise accessing content on the device. The user then selects from these automatically captured images as their selfiemoji. In other embodiments, the image file is selected by a selfiemoji logic or system that processes the selected image file and detects which emotion is most likely expressed in the image file by the user.

An intensity of an emotion or reaction expressed by a user in a selfiemoji is quantified by a user, a user base (e.g., crowdsourced opinion), or an artificial intelligence platform.

In some embodiments, the systems disclosed herein utilize AI which learns a likely emotional state of the user while viewing the content. The AI learns by comparing previously saved data and using the device to generate biometric data, such as the device's finger print sensor to scan the user's heartbeat, sound recorder to record verbal commands and verbal cues by the user, the camera to determine the dilation of the user's pupils and scanning the user's facial cues, hand gestures and body language to determine the user's emotional state.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
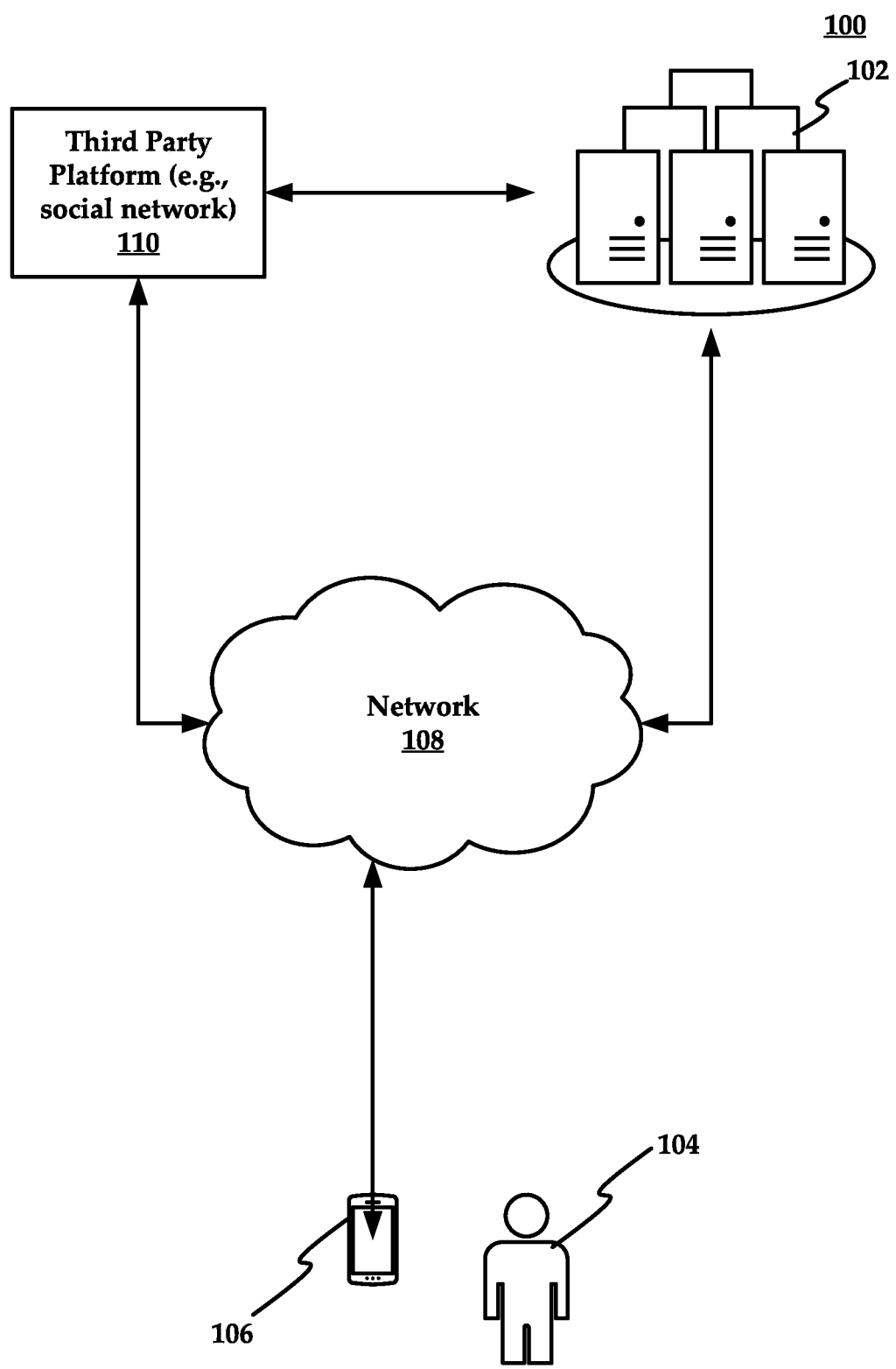
FIG. 1 is a schematic diagram of an example system that can be used to practice aspects of the present disclosure.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

For context, within social networking/social media websites, such as Facebook™, users can "react" to another user's posts and comments (referred to generally as "content") by clicking a "Like" button, and selecting any one of a plurality of system defined "reactions". The reactions are symbolized with icons depicting emotional states that the user can choose from to best describe their emotional response as a result of viewing the user's content. These icons are often animations, cartoons, and drawings such as smiley faces.

With the Facebook example, the user can choose their "reaction" by selecting from the facial icons (commonly called "emojis") that Facebook provides. With some platforms a user's choices are limited to the emojis depicting like, love, laugh, wow, sad, and angry. The social network keeps count of all of the user's reactions and displays it for all users to see.

For general description, the following terms will be defined. An emoji is a small digital image or icon used to express an idea, emotion, and so forth in electronic communication. Emojis can be static image or an animated image or video. A reaction/react is a part of the social networking platform's interaction system that allows a user to select from a list of "emojis" to express their emotional state as a result of viewing a post or comment, and attaching the selected emoji to the post or comment.

With respect to the systems and methods disclosed herein a selfiemoji is similar to a reaction, but instead of an emoji face, selfiemoji comprises a human face (in some embodiments the user's own or from a library) to depict the emoji. Selfiemojis can be used everywhere emojis can be used, in posts, comments, shares, and other applications, including third party apps through APIs (application programming interfaces).

In general, an API is a set of subroutine definitions, protocols, and tools for building application software. In general terms, it is a set of clearly defined methods of communication between various software components. A good API makes it easier to develop a computer program by providing all the building blocks, which are then put together by the programmer. An API may be for a web-based system, operating system, database system, computer hardware or software library. An API specification can take many forms, but often includes specifications for routines, data structures, object classes, variables or remote calls. POSIX, Microsoft Windows API, the C++ Standard Template Library and Java APIs are examples of different forms of APIs. Documentation for the API is usually provided to facilitate usage.

Generally speaking, the present disclosure is directed to systems and methods that enable the creation, display and management of human selfie photographs, human selfie animated photographs, human selfie video to depict emotions, and similar related concepts. These features are collectively referred to herein as selfiemojis, as defined above. From a content format perspective selfiemoji, in some embodiments, can comprise an image, a video or short video clip, an animated gif, or other similar content formats. In general, an animated gif is an animated Graphics Interchange Format, which is in turn a bitmap image format file. While examples here may refer to specific content formats, such as a selfiemoji as a picture or image, it will be understood that a selfiemoji can have any desired content format. Also, for brevity, the term "image file" or "photograph" will be understood to include both static image files (e.g., pictures) and dynamic image files (e.g., animated gifs and videos).

Some embodiments may involve the use of an "outtake" which is a video or picture that was created in the video production process that was not included in the final video. These outtakes can be stored and utilized in accordance with various embodiments disclosed herein.

Systems and methods that provide selfiemojis solve a host of computing technology centered problems for various users. Selfiemojis provide a solution for a user, who is defined herein as a person using a social network/social media website to post, interact and engage with other users. Rather than requiring the user to select from a pre-defined or supported set of emojis as defined by the social network, the user can create their own "reaction" beyond the default reactions and emojis provided by the social networking platform. In addition, the user can elect to take a "selfie" picture of their face and use their own face as the reaction image instead of a cartoon image of a regular emoji. The user can also search through the database for other emojis provided by the platform and selfiemojis created by other users. In these ways, the user has a much greater variety of choices to more accurately depict their emotion and preferred response.

Users who post original content that other users are reacting to with their Selfiemojis have a better understanding of actual user emotions by seeing the Selfiemojis with the user's facial expressions. Businesses can also benefit from the systems and methods disclosed herein which provide the businesses with better metrics and data analytics to more accurately target their audience for advertisements and increased sales.

Social networking platform system administrators can provide users with unlimited choices of selfiemojis for the users to select as their reaction. Administrators can create contests to promote higher active user participation. Social networking platforms can create revenue streams from premium services provided by the selfiemojis.

Third party websites, mobile applications, and third party developers can greatly increase the traffic to their website. Third party developers can use a published selfiemoji APIs to implement selfiemojis on their website and mobile applications. An authorized application can then connect into a selfiemoji database of users who have already created selfiemojis. Websites that implement the selfiemoji APIs do not have to recreate the selfiemoji system themselves, thus saving programming cost and time. For example, a WordPress™ plugin can be implemented that utilizes the selfiemoji APIs. In some embodiments, a plugin can be installed into any number of websites powered by the WordPress platform. When the plugin is installed, users with an active selfiemoji account can access a commenting system of the WordPress website without being required to complete a registration process for the website. Users without a selfiemoji account can create an account without ever leaving the website.

Selfiemojis enhance user engagement on any website that has the selfiemoji APIs implemented by giving users the ability to use an in-application camera to create their own selfiemojis using the user's own face to express the emotion or idea. Third party software developers can use the published selfiemoji APIs and connect to a selfiemoji database of users. Selfiemojis can be monetized by charging a fee to access the premium features in some embodiments.

In sum, users can directly embed their facial expressions as reactions instead of using impersonal emojis. This personalizes social interactions and makes the user's social engagement feel more subjective and authentic. Users can quickly identify the user feedback on their posts, which is often not possible when using pre-generated icons that may or may not accurately represent the emotion of the user. Also, the user's actual facial expression may deviate from what is provided by the social network platform in an emoji. For example, an excitement emoji provided by a social network platform may substantially differ from an excitement reaction that can be created using a photograph or video of a human being. Thus, selfiemojis provide for nuance and granular expression of an intensity of emotion by the user.

The user interface automatically adjusts the display of the selfiemojis based on various factors, including membership level, gamification statistics, and other metrics collected through the use of the selfiemojis.

In some embodiments, a selfiemoji application of the present disclosure can be implemented on mobile device which comprises software that can be operated via a social network user interface, but also independently as a standalone application. Interactive user interfaces can be used control the mobile device to present reactions for selection and generation of an indexed library of selfiemojis through capture of photographs using an integrated or external camera. The application can also be web-based and hosted on a server or cloud, or can also be executed on a laptop or other personal computer with a webcam.

Management of selfiemoji can comprise an ability to post these selfiemojis to a social network or other website, as well as access to a history line of selfiemojis allowing a user to see evolution of the user's selfiemojis over time.

Some embodiments comprise a master selfiemoji library which provides access to a user and/or a third party to a user's selfiemojis according to subscription model or other monetization scheme.

FIG. 1 is a schematic diagram of an example system or architecture 100 that can be used to practice aspects of the present disclosure. In more detail, the system 100 comprises an application server 102 or cloud that facilitates selfiemoji features disclosed herein. A user 104 can utilize a computing device 106, such as a Smartphone to interact with the application server 102 and create and utilize selfiemojis. The computing device 106 and the application server 102 are communicatively coupled over a network 108, which can comprise any public and/or private communications network.

It will be understood that the computing device 106 can comprise any computing device that is known to one of ordinary skill in the art. Examples include, but are not limited to mobile devices, laptop computers, personal computers, or any other similar computing device or system.

A third party platform 110, such as a social network platform, is accessible by the computing device 106 over the network 108 as well.

In some embodiments, the computing device 106 can utilize the selfiemoji features of the application server 102 directly. In other embodiments, the computing device 106 can interact with the third party platform 110. In these embodiments, the third party platform 110 is communicatively coupled with the application server 102 through an API provided by the application server 102. To be sure, any number or type of third party platform can access the selfiemoji features of the application server 102.

In some embodiments, the application server 102 provides a web-based interface (e.g., GUI—graphical user interface) that allows a user to create or utilize selfiemojis. Example GUIs are provided in FIGS. 3-12, which are described in greater detail infra.

In another embodiment, the computing device 106 executes a selfiemoji application that allows a user to create or utilize selfiemojis as disclosed herein. The selfiemoji application allows for interaction with the computing device 106. In some embodiments, the application server 102 and/or a client end user device, such as a mobile device or workstation is configured with a biometric reader, such as a built-in biometric device or a device attached thereto. The biometric device is a fingerprint scanner, eye scanner or other type of reader which is configured to gather biometrics in response to a user being scanned or imaged by the biometric device. In some embodiments, the biometric device mentioned is one of the input device(s) 30 in FIG. 14.

The application server and/or client end user device includes an AI machine learning system (AI hardware and/or AI software) configured to learn a likely emotional state of the user while viewing the content. The AI machine learning system is configured to learn by comparing previously saved data and using the aforesaid biometric device to generate biometric data, such as the device's finger print sensor to scan the user's heartbeat, sound recorder to record verbal commands and verbal cues by the user, the camera to determine the dilation of the user's pupils and scanning the user's facial cues, hand gestures and body language to determine the user's emotional state.

Figure 2:
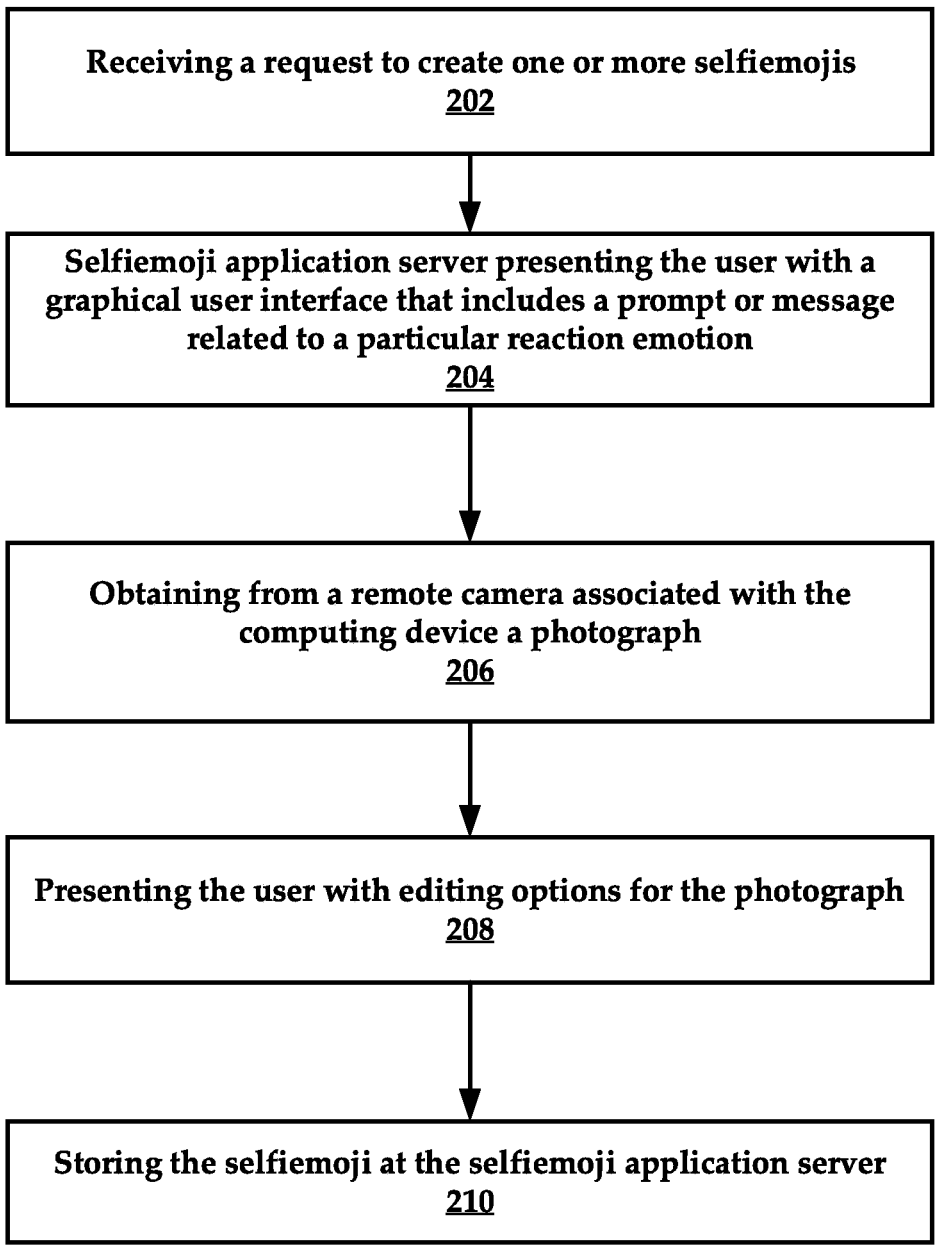
FIG. 2 is a flowchart of an example selfiemoji method.
Figure 3:
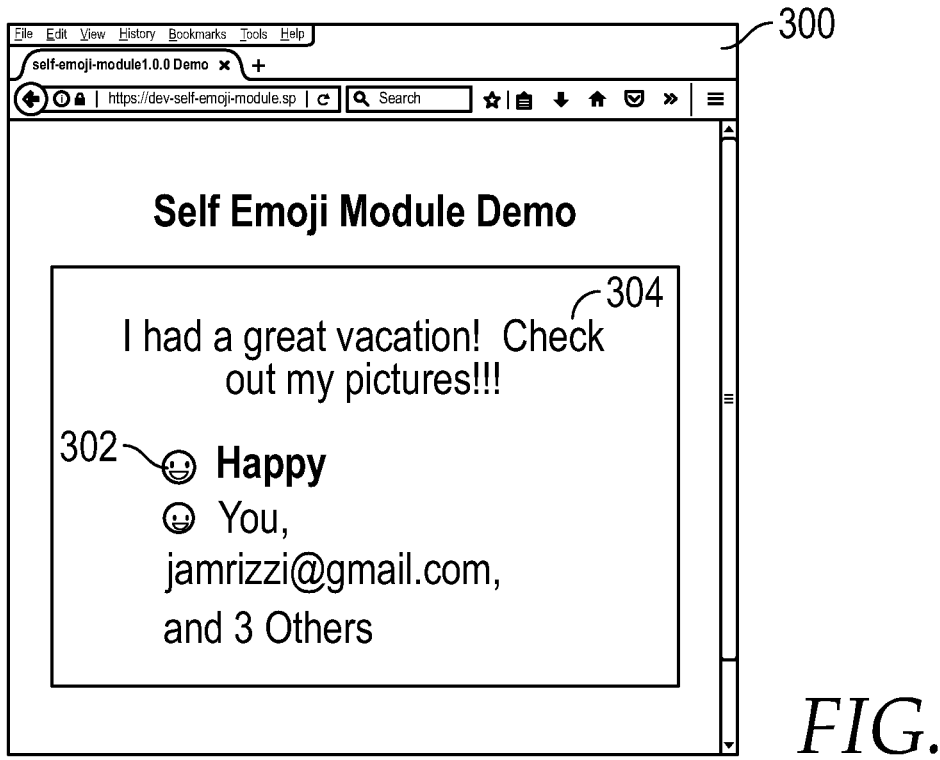
FIG. 3 is a screenshot of a GUI that illustrates generic emoji icons that are selectable to create selfiemojis of the present disclosure.

FIG. 2 is a flowchart of an example method of creating and storing selfiemojis in accordance with the present disclosure. In this embodiment, the method includes a step 202 of receiving a request to create one or more selfiemojis. This could include a user selecting or requesting through an application on their mobile device or on a computing device that is coupled with a selfiemoji application server that is served a web-based selfiemoji application. Also, this could include a third party application requesting the creation of a selfiemoji rather than the user. For example, the third party application can request the creation of a selfiemoji when the user selects to use an emoji.

The user can create an account that is stored on the selfiemoji application server. When selfiemojis are created, they are linked to the user account. In some embodiments, a selfiemoji is obtained and linked to a particular reaction emotion. A plurality of selfiemojis can be created that are each associated with a unique reaction emotion.

In order to obtain and create these various selfiemojis, the method includes a step 204 of the selfiemoji application server presenting the user with a graphical user interface that includes a prompt or message related to a particular reaction emotion. Using an in-application camera interface, the selfiemoji application server can inform the user that a particular reaction emotion is desired, such as a message or prompt reading "let's see your happy face". Example selfiemojis can be presented to the user to assist the user and re-enforce the type of reaction selected and remind user to pose for a camera accordingly.

The method then includes a step 206 of obtaining from a remote camera associated with the computing device a photograph. This can occur when the user clicks a button on the GUI provided by the selfiemoji application server. In another embodiment the selfiemoji application server can initiate a photograph automatically through a timed countdown. Rather than obtaining a photograph using the camera, the user can also select a previously obtained photograph stored on their device.

In some embodiments, the method includes a step 208 of presenting the user with editing options for the photograph. For example, the user can be provided with GUI based options to apply editing options that can add content, such as computer generated images or text, image correcting (e.g., crop, tone), green-screen effects that remove a background in the photograph other than the user's face, and facial recognition features, and combinations thereof. In some embodiments, facial recognition features are provided in order to differentiate between a user's face and other objects in a photograph. When implemented using artificial intelligence, the AI functionality of the system prevents selection of images or videos that are not qualified, i.e. it prevents selection of images or videos that are not consistent with the particular reaction emotion associated with the selfiemoji. For example, if the system determines that a photograph has a face that is obviously happy (e.g., detects a smile using facial recognition), the photograph will not be qualified as a "sad" selfiemoji.

The facial recognition can also assist in determining an emotion on the face of the user in a photograph. For example, if the user is prompted to provide a sad face, and the user instead provides a smile, the facial recognition features can detect that the user failed to provide the proper emotion and can prompt the user to retake the photograph. Otherwise, the photograph can be stored if desired. This can be based on a comparison between other selfiemojis stored by the selfiemoji application server, or based on a model generated from a composite of a plurality of photographs that represent a reaction emotion.

Thus, one or more computer generated graphics can be applied onto the one of the selfiemojis selected by the user through a graphical user interface as a computer generated graphic.

In addition to using facial recognition, the present disclosure can be directed also to using artificial intelligence (AI), simulated artificial intelligence, deep neural networks, and so forth in order to determine or recognize facial expressions and reaction emotions in photographs.

In some embodiments of the present disclosure, the systems and methods disclosed herein provide the ability for user base community moderation. An example of a user base community moderation, involves, in addition to using facial recognition, a user based community of moderators to determine or recognize facial expressions and reaction emotions in photographs. Additionally, the user can give permission for the selfiemoji application to turn on a camera or webcam when viewing any website or application that has the selfiemoji features installed or linked through an appropriate API.

In these embodiments, a user can select an image to share from the camera playback of captured images. The selfiemoji application or system uses AI to predict the images and emotional reactions the user will likely select. The user then approves/disapproves preselected images and reaction emotion assigned by the AI.

In some embodiments, in addition to controlling a camera or webcam, some systems of the present disclosure can implement biometric scanning. As noted above, the AI learns by comparing previously saved data and using the device to generate biometric data, such as the device's finger print sensor to scan the user's heartbeat, sound recorder to record verbal commands and verbal cues by the user, the camera to determine the dilation of the user's pupils and scanning the user's facial cues, hand gestures and body language to determine the user's emotional state.

Thus, the systems disclosed herein can utilize any number of biometric scanning devices, either integrated into a computing device or connectable as a standalone device to gather biometric information about the user. In some instances, the biometric data is obtained at the same time the user or the system is taking a photograph. The system can correlate the biometric data to the photograph, for example, to confirm, falsify, or fine-tune the inferred emotion.

AI continues to learn from user's preferences in some embodiments based on feedback, corrections, and manual associations between photographs and reaction emotions.

In one or more embodiments, a user can create an online AI identity using selfiemojis to communicate with other users, similarly to using an avatar.

In various embodiments, the selfiemoji application server can provide the user with the ability to accept or reject the ability to monetize the selfiemoji. For example, the selfiemoji application server can, if permission is obtained, charge subscription fee to the user or any other user to view a selfiemoji.

In step 210, the method includes storing the selfiemoji at the selfiemoji application server. For example, the selfiemoji (e.g., photograph linked with a reaction emotion) can be stored locally at the user's device, in a selfiemoji repository with selfiemojis from other users, or also in the user's account maintained by the selfiemoji application server.

The method can then include presenting the user with a list of reaction emotions such as happy, sad, anger, confusion, perplexed, and so forth.

In some embodiments, the request to create one or more selfiemojis is within the context of the user interacting with a third party application, such as a social network. In one embodiment, a social network utilizes the selfiemoji function through an API to the selfiemoji application server.

When the user views a post on the social network or mobile application, in response to clicking on post, a reaction interface is presented to the user for selecting a selfiemojis to be associated with the user account and the particular reaction/emotion being depicted. This reaction interface can be provided by the social network, a selfiemoji application executing on the mobile device, and so forth.

The user is presented with a list of "reactions" to create a selfie depicting that reaction. Next, the user selects a reaction to create and is then presented a message or prompts to react according to the selected type of reaction emotion. For example, the user is asked to "look happy", "look sad", "look angry", "look surprised" and so on to re-enforce the type of reaction selected and remind user to pose for the camera accordingly. The method can proceed with obtaining a photograph and tagging or linking the photograph to the prompted reaction emotion. If desired, the user can edit the photo as noted above. The selfiemoji is inserted into the social network post as mediated by the third party application.

In some embodiments, other users can interact with the user's selfiemoji by commenting text or sending a selfiemoji reaction.

With respect to third party development. A third party developer can create a developer account with the selfiemoji application server. General verification and authentication protocols can be established. In some embodiments, third party applications make API calls to the selfiemoji application server when needed. These third party developers can "pay to play" at increasing levels of participation—i.e., subscribing to higher levels for more bandwidth and other premium services The selfiemoji application allows for creation of selfie photographs associated with reactions. While logged in the user can post to other third party sites using selfies and associated reactions. In some embodiment, the user's selfiemoji account and social network account are linked together via APIs to enable these features. For example, the social network can be integrated within the selfiemoji platform.

In some embodiments, when a user logs out of their account, the user can also go a third party application and view the selfiemojis they created if the third party application has authorization to show selfiemojis. In some embodiments, these selfiemojis cannot be posted to the third party application unless the user has logged into their selfiemojis account and enabled account subscription, or provided the third-party application with permission.

The selfiemoji application server also allows for tracking metrics concerning usage of selfiemojis and associated information whether from users or third parties. Metrics include, but are not limited to, number of reactions generated, intensity of reaction(s), comments generated, votes accumulated, number of likes, number of selfies, dates and times, tips as a result of a post and so forth.

In another use case, selfiemojis are created in a semi-automatic manner. In these embodiments, users allow the creation of selfiemojis through their camera or webcam. The user uses their device (which includes a camera or webcam) to surf the web and/or use other applications. During usage, a camera captures user's facial reactions during their device usage.

Next, the user is presented with a choice of images to use for a reaction selfiemoji. Again, these can be example selfiemojis obtained from other users or stock images. In some embodiments, the user is allowed to take multiple photographs, create multiple selfiemojis, and select their preferred selfiemoji. The user selects desired image to use as the selfiemoji and edits the selfiemoji if desired.

As noted above, the user can set permissions and assigns for the selfiemoji that allow for monetization. The user can then select to save and/or publish the selfiemoji for current or later use.

In some embodiments, users can view selfiemojis that their access level permits. For example, if the user has paid only to view their selfiemojis, the user may not be allowed to view the selfiemojis of other users. In these instances, the selfiemojis of other users may be replaced with generic or stock emojis, and/or generic or stock selfiemojis (e.g., pre-generated selfiemojis). If the user desires to view and/or use other users' selfiemojis, the user can request and/or pay for the ability to see selfiemojis other than their own. In some embodiments, a user can publish their selfiemoji with explicit permission that allows other users to use the selfiemoji as their own for a subscription or, in some instances, for free.

In one or more embodiments, the user can view the selfiemojis shared by users who have reacted to the post and comment. For example, when the user hovers mouse over the "like" button the selfiemojis shared for the post will display by the third party application A gesture such as a tap or swipe can be used on the selfiemojis applications to display selfiemojis.

In various embodiments, users have a settings option for viewing the selfiemoji. These settings can include but are not limited to number of images to display per screen, size of image, filtering to include and exclude, animation on/off, and others. Some applications and systems can implement selfiemojis based on search filter criteria.

Also in some embodiments, users are provided with different permission levels. For example, some users actually view a history line of another user's selfiemojis. Thus, a history of their library showing the history and different types of selfiemojis used by the particular user and/or posts to third party or selfie platform and the different kinds of selfies and reactions used by a particular user.

As noted above, the selfiemoji applications and features can be monetized by creating premium digital goods and services. For example, premium features can include, but are not limited to, premium photo filters, premium themes, number of selfiemojis the user can publish, permission to view premium selfiemojis, and so forth—just to name a few.

FIGS. 3-12 collectively illustrate a process for selfiemoji creation and use in accordance with the present disclosure. With respect to FIG. 3, a user visits a webpage 300 running a selfiemoji module, application, or API. In this example, only basic emoji icons are displayed, such as icon 302. Content, such as a textual comment 304 appears above the comments and the reactions.

In this example, the "happy" emoji 302 has been previously selected. When this webpage loads, the selfiemoji module requests data from the selfiemoji API server, referred to above as the selfiemoji application server. The selfiemoji applications server checks if the user is currently logged in to their selfiemoji account. If so, then the visitor is presented with the selfiemojis that the user has the permission level to view. The style that the webpage renders the API data is customizable in some embodiments.

Figure 4:
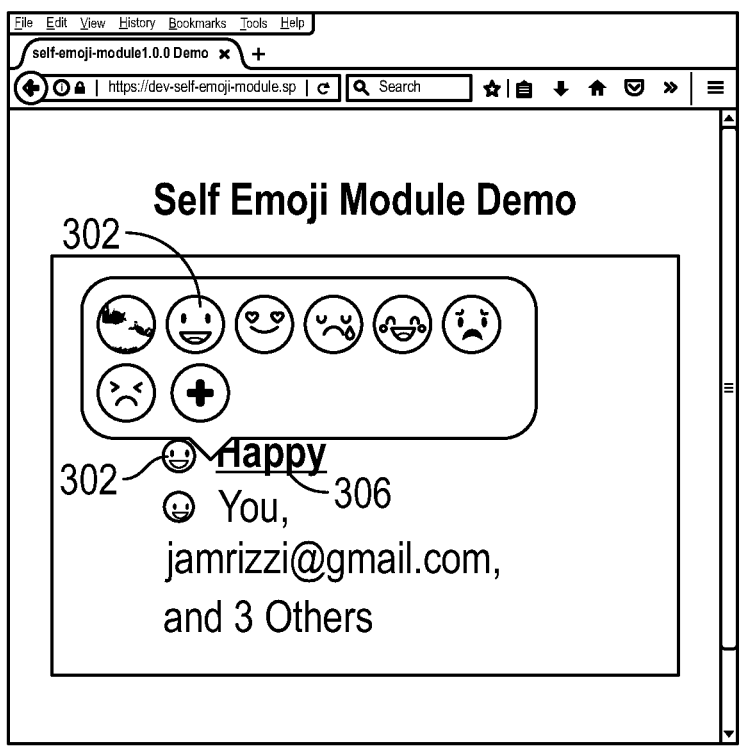
FIG. 4 is a screenshot of a GUI that illustrates the display of a plurality of emoji icons and reaction emotion categories.
Figure 5:
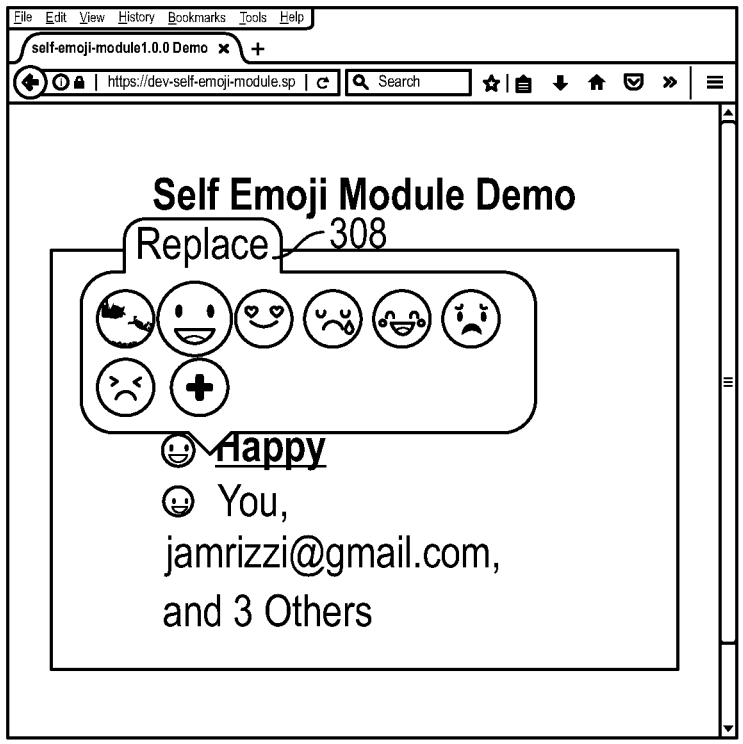
FIG. 5 is a screenshot of a GUI that illustrates selection of a specific emoji icon.

The user then hovers their mouse pointer over the "reactions" link 306 and activates the selfiemoji module as illustrated in FIG. 4. The user can select their "reaction" from the system defined reaction emojis (the emoji icons) that are linked to the happy reaction emotion, or create a selfiemoji to replace the emoji icon 302.

In this example, it is assumed that the user has not uploaded any selfiemojis. Thus, the website displays the default emoji icons for each reaction emotion. As illustrated, the emotion icon 302 has a message of "replace" displayed above thereof, as in FIG. 5. The user hovers over the "happy" emoji 302 and clicks on the replace tab 308.

Figure 6:
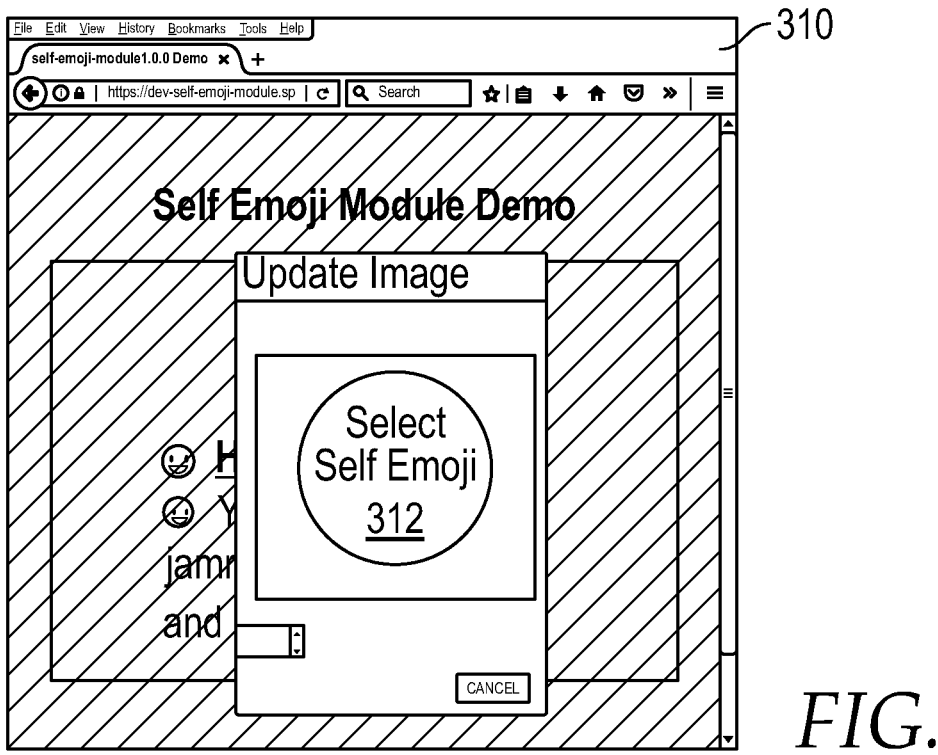
FIG. 6 is a screenshot of a GUI that illustrates a popup for receiving a photograph of a user that is used to create a selfiemoji.

As illustrated in FIG. 6, in response, a popup menu 310 appears for the user to select an image or photograph. User clicks inside the "Select Self Emoji" area 312 to initiate the photo selection process.

Figure 7:
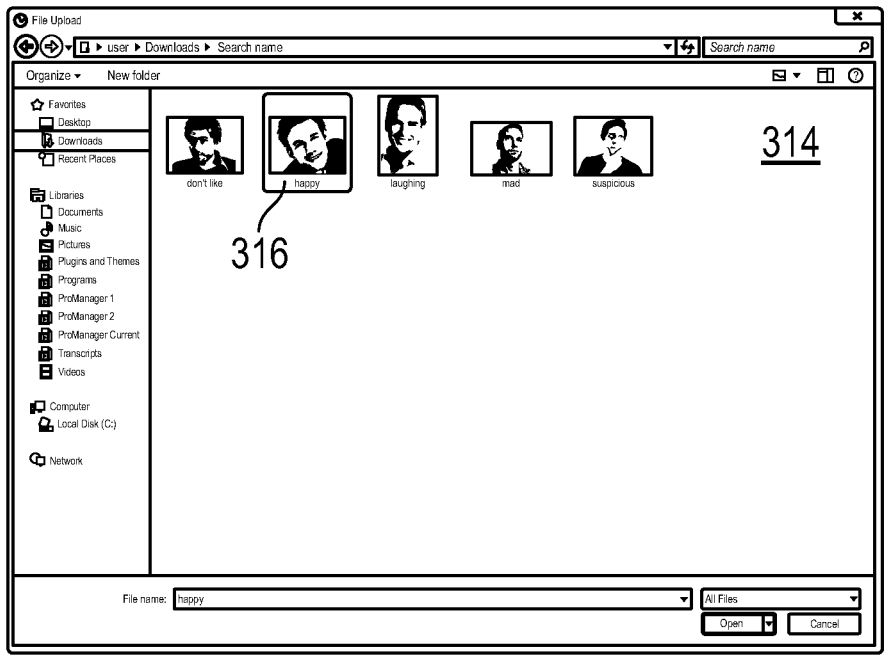
FIG. 7 is a screenshot of a GUI that illustrates a gallery of photographs and images that were previously stored in association with a reaction emotion, i.e., selfiemojis.

If the visitor already has a selfiemoji account, then the Selfie images can be located on the selfiemoji API server or locally on the user's device as illustrated in this figure. The client software (website or application) uses the API's to access those images stored on the selfiemoji API server. An example selfiemoji gallery 314 maintained on the user's device is illustrated in FIG. 7. As illustrated, each photograph or other selfiemoji content is labeled with a reaction emotion.

For mobile users, a user's primary choices of creating selfiemojis are (1) through the use of an in-application camera and (2) webcam for website visitors. In this example the user chooses the "Happy" file 316.

Figure 8:
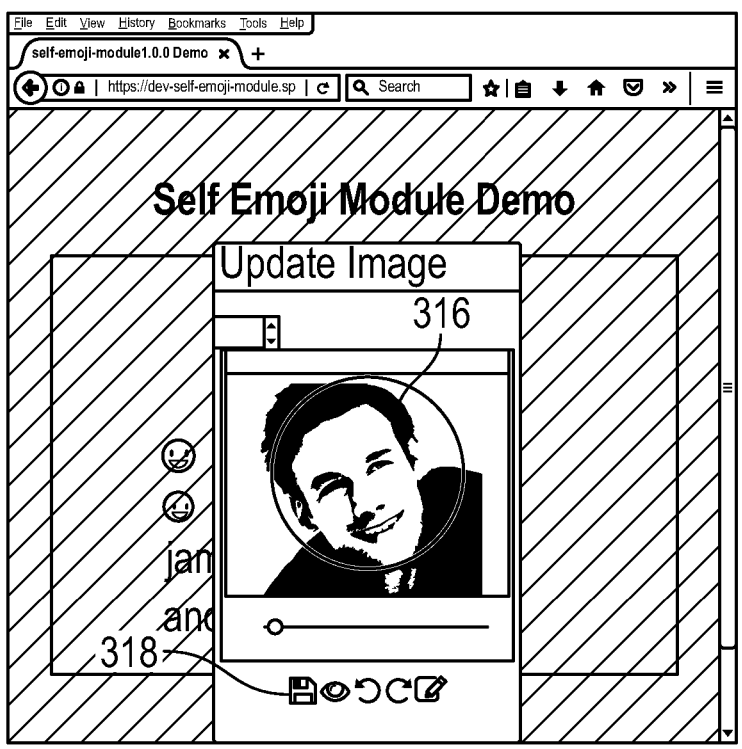
FIG. 8 is a screenshot of a GUI that illustrates a selected selfiemoji photograph and editing tools therefore according to one embodiment.

Prior to publishing, the user can edit the selected selfiemoji selected from the selfiemoji photograph gallery using editing features illustrated in FIG. 8. In this embodiment, editing of the photograph used for the selfiemoji can be performed locally by website software, by the selfiemoji application, or through the selfiemoji API server interface.

When the user clicks on the save icon 318, the website or selfiemoji application sends an API Post to the selfiemoji application server that contains the pertinent data regarding the newly created selfiemoji. The selfiemoji application server accepts posted data and writes the pertinent data into the database, and stores the uploaded image as a selfiemoji. Again, this includes storing a photograph in combination with a reaction emotion.

Figure 9:
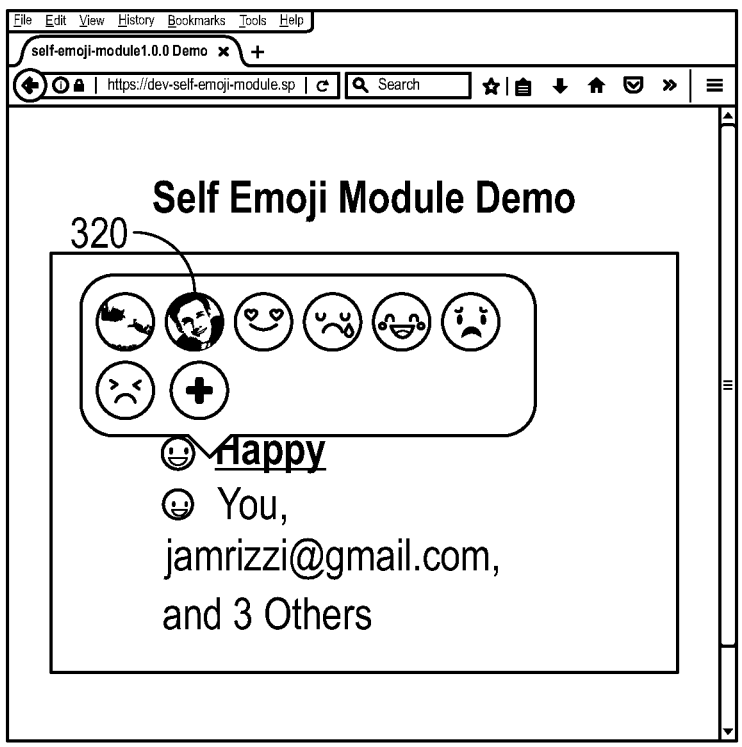
FIG. 9 is a screenshot of a GUI that illustrates the replacement of a generic emoji icon with a selfiemoji photograph according to one embodiment.

FIG. 9 illustrates the selfiemoji API server sending available selfiemojis (e.g., comprising a photograph as illustrated), such as selfiemoji 320 to the client for the selfiemojis application to render. In this instance, the happy emoji icon has been replaced with the happy selfiemoji 320.

In some embodiments, the user repeats process for another example reaction emotion, such as a mad emoji and replaces it with a mad selfiemoji. The selfiemoji application server stores pertinent information into a database that is accessible as a library or image gallery.

Figure 10:
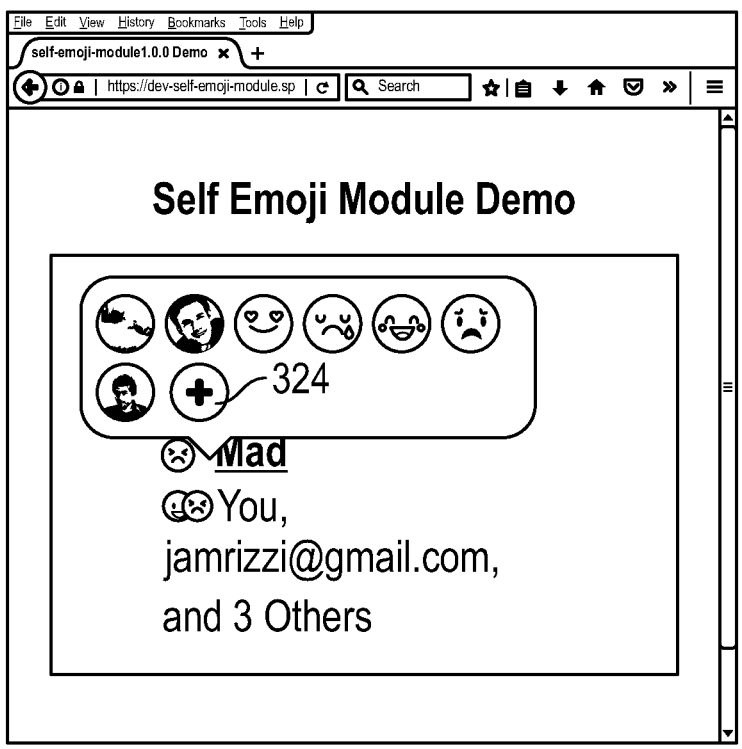
FIG. 10 is a screenshot of a GUI that illustrates the initiation of creating a new custom selfiemoji according to one embodiment.

In some embodiments, users using the selfiemoji system have the ability to create "custom" selfiemojis. For instance, custom selfiemojis are user created "reactions" that are not already in the system default list of emojis. In FIG. 10, a user clicks on the "+" sign 324 to create a custom personal selfiemoji.

Figure 11:
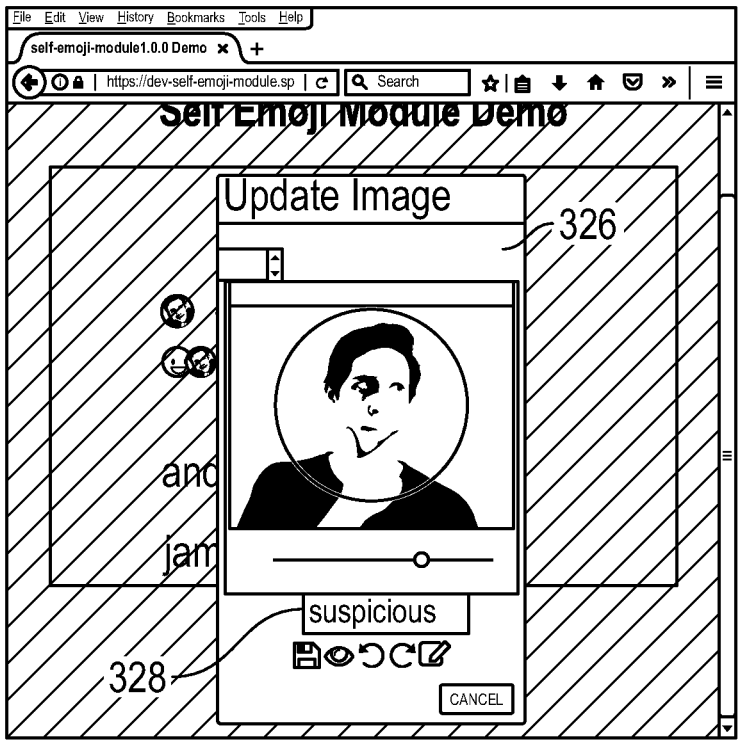
FIG. 11 is a screenshot of a GUI that illustrates the editing of a custom photograph obtained from a camera, such as a mobile phone camera, or a webcam according to one embodiment.

In FIG. 11, a popup 326 appears as before, but with an entry field 328 labeled "Category Name". The Category Name is the name of the custom selfiemoji depicting a custom reaction emotion which may or may not be in the list of the default reaction emotions or generic emojis.

As illustrated in FIG. 11, the user enters "suspicious" in the category field, and saves the selfiemoji. Thus, in this instance, the photograph is associated or linked to a reaction emotion of suspicious. The client software posts the pertinent data to the selfiemoji API server. The selfiemoji API server saves the selfiemoji into the database. In this example, the reaction emotion is determined from user input through a graphical user interface that displays an image captured by the camera.

Figure 12:
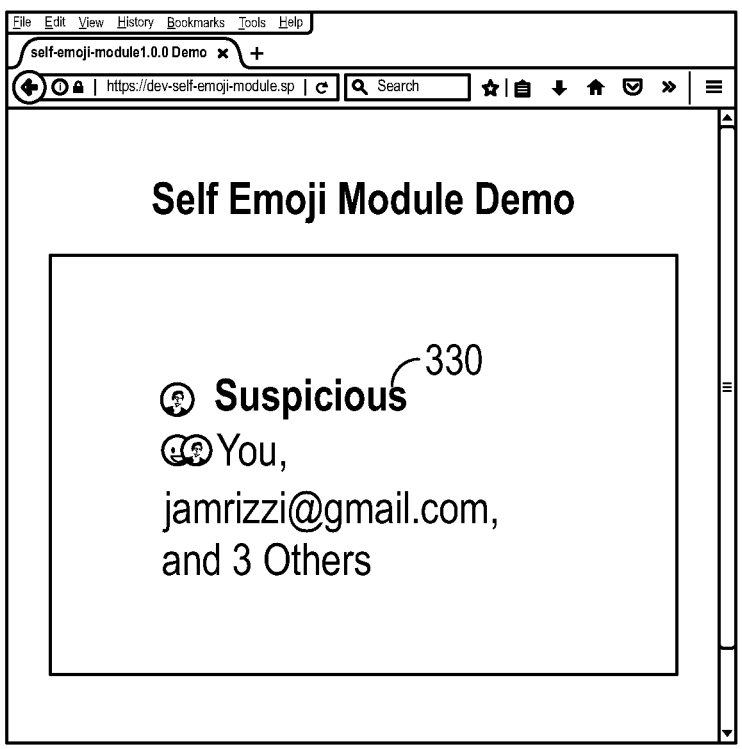
FIG. 12 is a screenshot of a GUI that illustrates the selfiemoji as a selectable option on a webpage.

In FIG. 12, the selfiemoji API server sends pertinent data to the client such as how many reactions, selfiemojis, and so forth are available. A new category 330 of "Suspicious" is now selected as the desired reaction selfiemoji.

Figure 13:
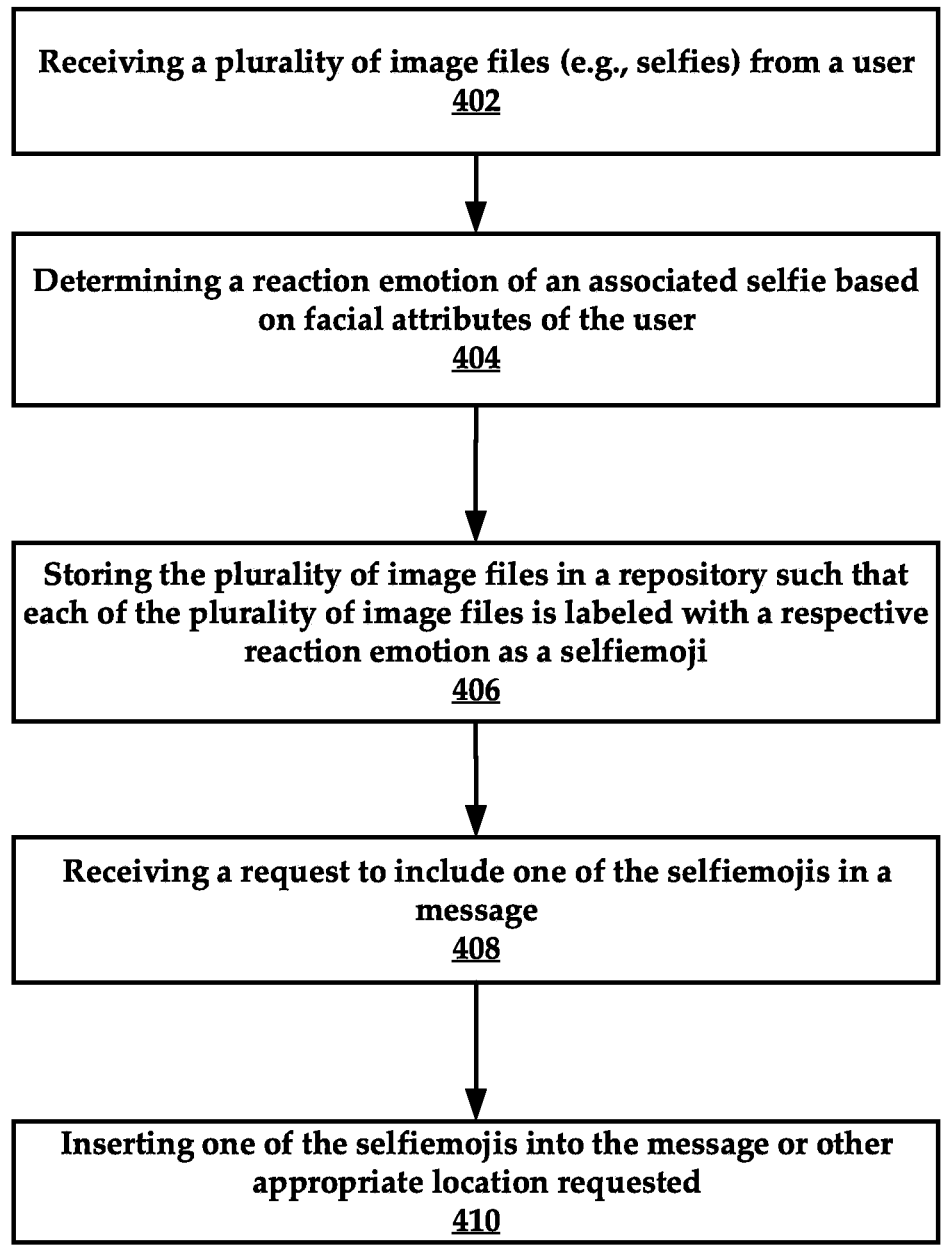
FIG. 13 is a flowchart of another example emoji creation and usage method.

In light of the above descriptions, additional example methods are described in greater detail below. For example, in FIG. 13 a flowchart of another example method for creating and using a selfiemoji is illustrated. This process includes creating multiple pre-generated selfiemojis, but can be used to create on-the-fly (e.g., real-time or near real-time) selfiemojis, and individual selfiemojis as well.

In one embodiment, the method includes a step 402 of receiving a plurality of image files from a user device. In some embodiments, each of the image files comprising a selfie of the user. These can be received based on request from an application, server, or third party service. The plurality of image files are received through a camera of a mobile device controlled through an application residing on the mobile device. Alternatively the photos are received through a webcam within a computer or connected to a computer as a peripheral.

In some embodiments, the selfiemoji application can automatically activate a camera of a computing device utilized by the user. For example, when the user selects to create a new selfiemoji, the camera can be activated by selection of a button or area in a GUI.

For each of the plurality of image files, the method can include a step 404 of determining a reaction emotion of an associated selfie based on facial attributes of the user. Again, this can be done using AI, facial recognition, or can be based on a selection of a reaction emotion category as illustrated in the example embodiments of FIGS. 3-12. In another embodiment, the user base community or moderators can "vote" an emotion to associate with a selfie.

Next, the method comprises a step 406 of storing the plurality of image files in a repository such that each of the plurality of image files is labeled with a respective reaction emotion as a selfiemoji, as well as other content that is pertinent to the image and/or the user These selfiemojis can be stored in a user account on the selfiemoji application server. Also, these steps collectively are descriptive of the creation and storage of selfiemojis.

In a related process, the method can include a step 408 of receiving a request to include one of the selfiemojis in a message. This could also alternatively include a request to include the selfiemojis in a social media blog post or any online media and articles.

The method also includes a step 410 of inserting one of the selfiemojis into the message or other appropriate location requested. Again, this can be performed at the device level of the end user, through a web interface provided by a selfiemoji application server, or through a third party service that uses an API to access selfiemoji features. Thus, the message can be formatted for display on a social network or any online or offline media platform.

As noted above, the reaction emotion is determined utilizing facial recognition software with emotional analysis in some embodiments. In other embodiments, the reaction emotion can be determined through user base voting, where the photograph is presented to a plurality of users who can cast votes for what emotion is likely being presented in the photograph.

In some embodiments, the method can include providing a plurality of matching image files comprising selfies and corresponding reaction emotions generated by other users. As noted above, access to the reaction emotions generated by the user or other users is based on access level permissions that can be mediated by a user fee or surcharge.

In some embodiments, the selfiemoji application is configured to determine an emotion associated with the message, and automatically selecting a portion of the selfiemojis having reaction emotions that correspond to the emotion associated with the message. Again, this determination can be done through AI, facial recognition software, voting, and so forth.

In some embodiments, prior to receiving the plurality of image files from a user device, the method can include providing the user with a plurality of reaction emotion categories. In these embodiments, an image file is generated for each of the plurality of reaction emotion categories.

Figure 14:
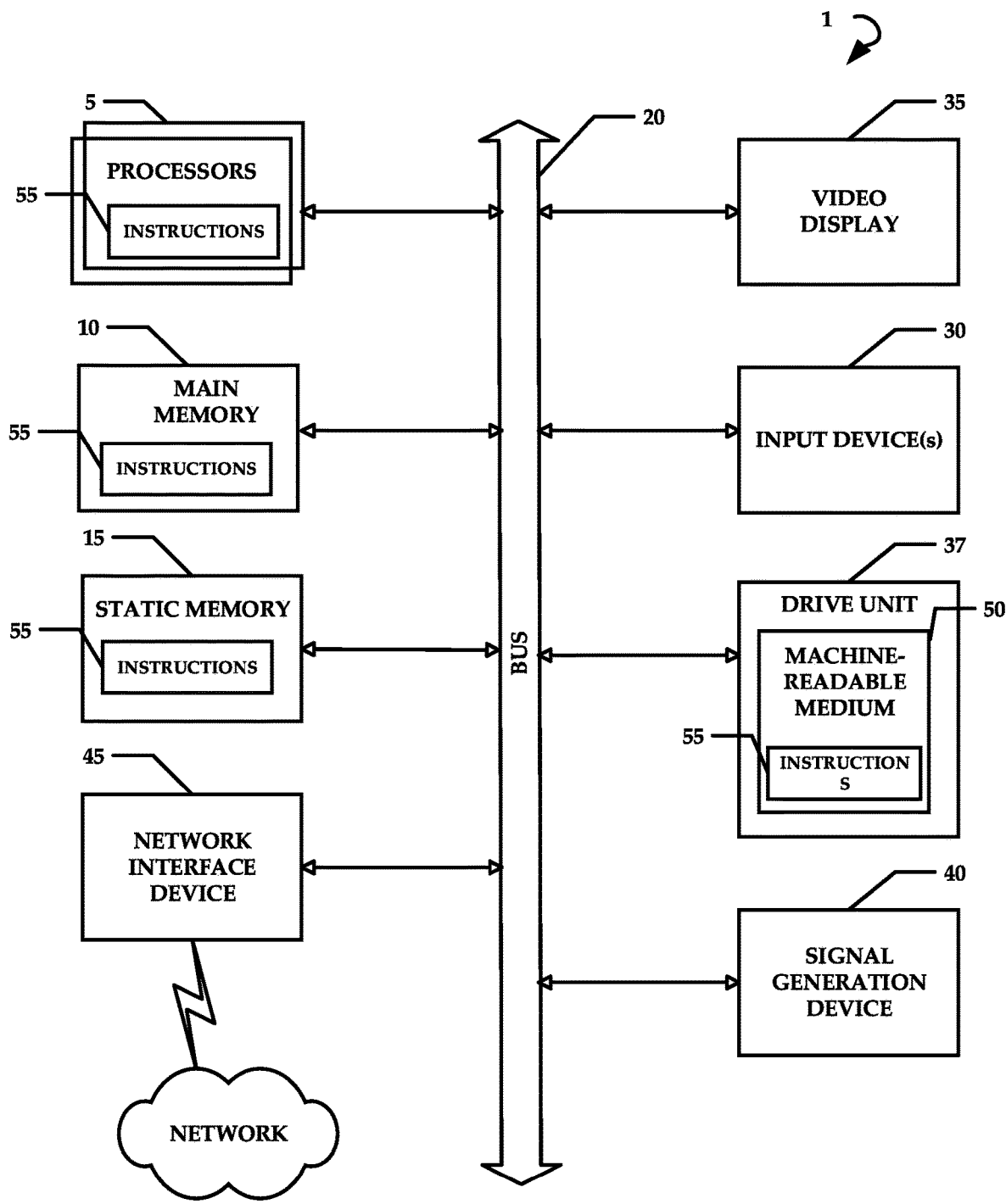
FIG. 14 is a schematic diagram of an example computing machine that can be used to implement aspects of the present disclosure.

In some embodiments, the systems and methods disclosed herein can create an historical set from a plurality of image files that are associated with a particular emotion. For example, if the user and/or the selfiemoji platform generate selfiemojis for the user over time, the user's expressions of emotions or reactions may change over time. The system can create an historical set of selfiemojis in the form of an historical gif or an historical video of the individual selfiemojis. The historical set allows a user's emotional expressions or reactions to be viewed from a perspective of change or evolution. Thus, the longer a user uses the selfiemoji platform, the more history the user has with the system and the large volume of selfiemojis may be present for creation of the historical sets. FIG. 14 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a dedicated camera or webcam, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an input device(s) 30, such as an alpha-numeric input device (e.g., a keyboard), a cursor control device (e.g., a mouse), a voice recognition device and/or biometric verification unit, a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. This drive unit can include any mass data storage unit. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
   presenting to a user through a user device a prompt or message that incites a reaction emotion facial response from the user;
   displaying an example selfiemoji or emoji to the user to assist the user and re-enforce the reaction emotion facial response required, the example selfiemoji or emoji comprising an example facial response of a face;
   automatically activating a camera of a computing device utilized by the user, wherein a plurality of image files are captured using the camera;
   receiving the plurality of image files from the camera, each of the image files comprising a selfie of the user with the reaction emotion facial response;
   storing the plurality of image files in a repository, each of the plurality of image files being labeled with the reaction emotion facial response as a selfiemoji;
   providing a plurality of matching image files comprising selfies and corresponding reaction emotions generated by other users, wherein access to the reaction emotions generated by other users is based on access level permissions, wherein the access level permissions allow the user to view a history line of selfmojis created by a second user and the history line comprises different types of selfies and reactions used by the second user;
   receiving a request to include one of the selfiemojis or one of the plurality of matching image files in a message; and
   inserting one of the selfiemojis or one of the plurality of matching image files into the message.

2. The method according to claim 1, wherein the reaction emotion is determined utilizing facial recognition with emotional analysis.

3. The method according to claim 1, wherein the message is formatted for display on a social network.

4. The method according to claim 1, wherein the plurality of image files are received through a camera of a mobile device controlled through an application residing on the mobile device.

5. The method according to claim 1, further comprising: determining an emotion associated with the message; and automatically selecting a portion of the selfiemojis having reaction emotions that correspond to the emotion associated with the message, wherein the one of the selfiemojis is selected from the portion of the selfiemojis.

6. The method according to claim 1, further comprising, prior to receiving the plurality of image files from the user device, presenting the user with a plurality of reaction emotion categories, wherein an image file is generated for each of the plurality of reaction emotion categories.

7. The method according to claim 1, further comprising applying one or more computer generated graphics onto the one of the selfiemojis selected by the user through a graphical user interface.

8. The method according to claim 1, further comprising applying one or more filters to the one of the selfiemojis selected by the user through a graphical user interface.

9. The method according to claim 1, further comprising applying a greenscreen filter to remove a background.

10. The method according to claim 1, wherein the reaction emotion is determined from user input through a graphical user interface that displays an image captured by the camera.

11. The method according to claim 1, wherein selfiemojis of a plurality of users associated with the message are displayed when an input device of the user touches or hovers over the message.

12. The method according to claim 1, further comprising receiving edits to any of the selfiemojis prior to storage of the selfiemojis, the edits comprising any of filtering, animations, image size, and combinations thereof.

13. A system, comprising:
a processor; and
a memory for storing executable instructions, the processor executing the instructions to:
present to a user through a user device a prompt or message that incites a reaction emotion facial response from the user;
display an example selfiemoji or emoji to the user to assist the user and re-enforce the reaction emotion facial response required, the example selfiemoji or emoji comprising an example facial response of a face;
automatically activate a camera of a computing device utilized by the user, wherein a plurality of image files are captured using the camera;
receive the plurality of image files from the camera, each of the image files comprising a selfie of the user;
store the plurality of image files in a repository, each of the plurality of image files being labeled with the reaction emotion facial response as a selfiemoji;
provide a plurality of matching image files comprising selfies and corresponding reaction emotions generated by other users, wherein access to the reaction emotions generated by other users is based on access level permissions, wherein the access level permissions allow the user to view a history line of selfmojis created by a second user and the history line comprises different types of selfies and reactions used by the second user;
receive a request to include one of the selfiemojis or one of the plurality of matching image files in a message; and
insert one of the selfiemojis or one of the plurality of matching image files into the message.

14. The system according to claim 13, wherein the system is configured to generate an historical set from a plurality of image files that are associated with a particular emotion, the plurality of image files being captured over a given period of time.

15. The system according to claim 13, further comprising an application programming interface that allows a third party application to deliver the request to include one of the selfiemojis in a message to the system.

16. The system according to claim 15, wherein the message is displayed on the third party application.

17. The system according to claim 13, wherein the processor further executes the instructions to:
determine an emotion associated with the message; and
automatically select a portion of the selfiemojis having reaction emotions that correspond to the emotion associated with the message, wherein the one of the selfiemojis is selected from the portion of the selfiemojis.

18. A method, comprising:
receiving permission from a user to automatically activate a camera of a computing device to obtain images of the user when the user is viewing a website that implements a selfiemoji functionality or utilizes an application programming interface that couples the website with a selfiemoji service;
presenting to the user through a user device a prompt or message that incites a reaction emotion facial response from the user;
displaying an example selfiemoji or emoji to the user to assist the user and re-enforce the reaction emotion facial response required, the selfiemoji or emoji comprising an example facial response of a face;
automatically activating the camera of the computing device utilized by the user when the user accesses the website, wherein a plurality of image files are captured using the camera;
receiving the plurality of image files from the camera, each of the image files comprising a selfie of the user with the required reaction emotion facial response;
storing the plurality of image files in a repository, each of the plurality of image files being labeled with the reaction emotion facial response as a selfiemoji;
receiving a request to include one of the selfiemojis in a message; and
inserting one of the selfiemojis into the message.

* * * * *